United States Patent [19]

Hinschlager

[11] Patent Number: 5,419,216
[45] Date of Patent: May 30, 1995

[54] SELF-ADJUSTING ACTUATION MECHANISM

[75] Inventor: Robert A. Hinschlager, St. Marys, Ohio

[73] Assignee: Huffy Corporation

[21] Appl. No.: 94,701

[22] Filed: Jul. 22, 1993

[51] Int. Cl.$^6$ ............................. F16C 1/10; F16C 1/22
[52] U.S. Cl. ...................... 74/502.2; 74/489; 74/501.5 R
[58] Field of Search ............... 74/501.5 R, 502.2, 489, 74/575, 577 R, 577 M, 578; 188/196 B

[56] References Cited

U.S. PATENT DOCUMENTS

| | | | |
|---|---|---|---|
| 3,759,352 | 9/1973 | Toplis | 74/501.5 R |
| 4,066,154 | 1/1978 | Ross | 74/501.5 R X |
| 4,753,123 | 6/1988 | Stormont | 74/501 |
| 4,785,683 | 11/1988 | Buckley et al. | 74/489 |
| 4,819,501 | 4/1989 | Kraus et al. | 74/538 |
| 4,914,971 | 4/1990 | Hinkens et al. | 74/502 |
| 4,958,532 | 9/1990 | Lin | 74/489 |
| 5,138,897 | 8/1992 | Beard et al. | 74/501 |

*Primary Examiner*—Charles A. Marmor
*Assistant Examiner*—Mary Ann Battista
*Attorney, Agent, or Firm*—Biebel & French

[57] ABSTRACT

A self-adjusting actuation mechanism is disclosed for use in a cable actuated system, such as a bicycle caliper brake system. The actuation mechanism includes a housing and a lever pivotally attached to the housing. A cable assembly is provided for operating an actuated mechanism and the cable assembly includes a sheath and a cable slidably positioned within the sheath and attached to the lever wherein actuation of the lever causes the cable to move in a first direction. An abutment member is supported within the housing in engagement with an end of the sheath and the abutment member is mounted for movement relative to the housing in a second direction opposite to the first direction in response to actuation of the lever whereby the effective length of the sheath is increased.

12 Claims, 3 Drawing Sheets

SELF-ADJUSTING ACTUATION MECHANISM

BACKGROUND OF THE INVENTION

The present invention relates to a self-adjusting actuation mechanism and, more particularly, to a self-adjusting actuation mechanism for use in a cable actuated system, such as a bicycle caliper brake system.

In typical caliper brake systems for bicycles, a caliper is operated by pulling a cable against a compressive force provided by a sheath surrounding the cable. Relative movement between the cable and the sheath results in movement of the caliper to cause brake pads on the caliper to engage opposing sides of a wheel rim. During repeated use of the brake system, the effectiveness of the system deteriorates as a result of the cable stretching, compression of the sheath and wear of the brake pads. As a consequence, greater movement of the brake actuating lever is required to move the brake pads into contact with the wheel rim.

A common solution to the deterioration resulting from changes in the length of the cable and sheath, as well as from brake pad wear, is the provision of a sheath adjustment at either the brake caliper or the lever whereby the effective length of the sheath is increased. In addition, the attachment point of the cable to the caliper may be adjusted to take up excessive amounts of slack in the cable.

However, the need for performing a brake adjustment is not always readily obvious to the operator of the bicycle in that the deterioration of the brake effectiveness occurs gradually over time such that the operator may become accustomed to compensating for any deficiencies in the braking system.

Accordingly, there is a need for an actuation mechanism for use in a cable actuated system, such as a bicycle caliper brake system, which may be easily adjusted. In addition, there is a need for such an adjustment to be accomplished automatically such that the mechanism is self-adjusting.

SUMMARY OF THE INVENTION

According to the present invention, a self-adjusting mechanism is provided for use with a cable actuated system, such as a bicycle caliper brake system, wherein the mechanism provides for automatic adjustment of the cable during actuation of the mechanism.

In accordance with one aspect of the invention, a self-adjusting actuation mechanism is provided comprising a housing, a lever operatively attached to the housing, a cable assembly including a sheath and a cable slidably positioned within the sheath, a connection between the cable and the lever wherein movement of the lever relative to the housing causes movement of the cable in a first direction relative to the sheath, and adjustment means mounted for movement to adjust the range of movement of the cable relative to the sheath in response to movement of the lever beyond a predetermined limit.

In a further aspect of the invention, the adjustment means comprises means for adjusting the position of the sheath relative to the housing including an abutment member located on the housing adjacent to an end of the sheath, and transfer means for moving the abutment member in a second direction opposite to the first direction and outwardly from the housing in response to movement of the lever pulling the cable in the first direction.

The abutment member is provided with a toothed surface and a pawl member is provided connected to the lever such that movement of the lever pulling the cable in the first direction toward the housing causes the pawl member to push the abutment member toward the sheath whereby the effective length of the sheath is increased to adjust the travel of the cable through the sheath.

It is therefore a primary object of the present invention to provide a self-adjusting actuation mechanism including a sheath and a cable slidably positioned therein and actuated by a lever wherein actuation of the lever automatically provides for adjustment of the cable relative to the sheath.

It is a further object of the invention to provide such a self-adjusting actuation mechanism wherein the adjustment of the cable relative to the sheath is in response to movement of the lever beyond a predetermined limit.

Other objects and advantages of the invention will be apparent from the following description, the accompanying drawings, and the appended claims.

DETAILED DESCRIPTION OF THE PREFERRED EMBODIMENT

Figure 1:
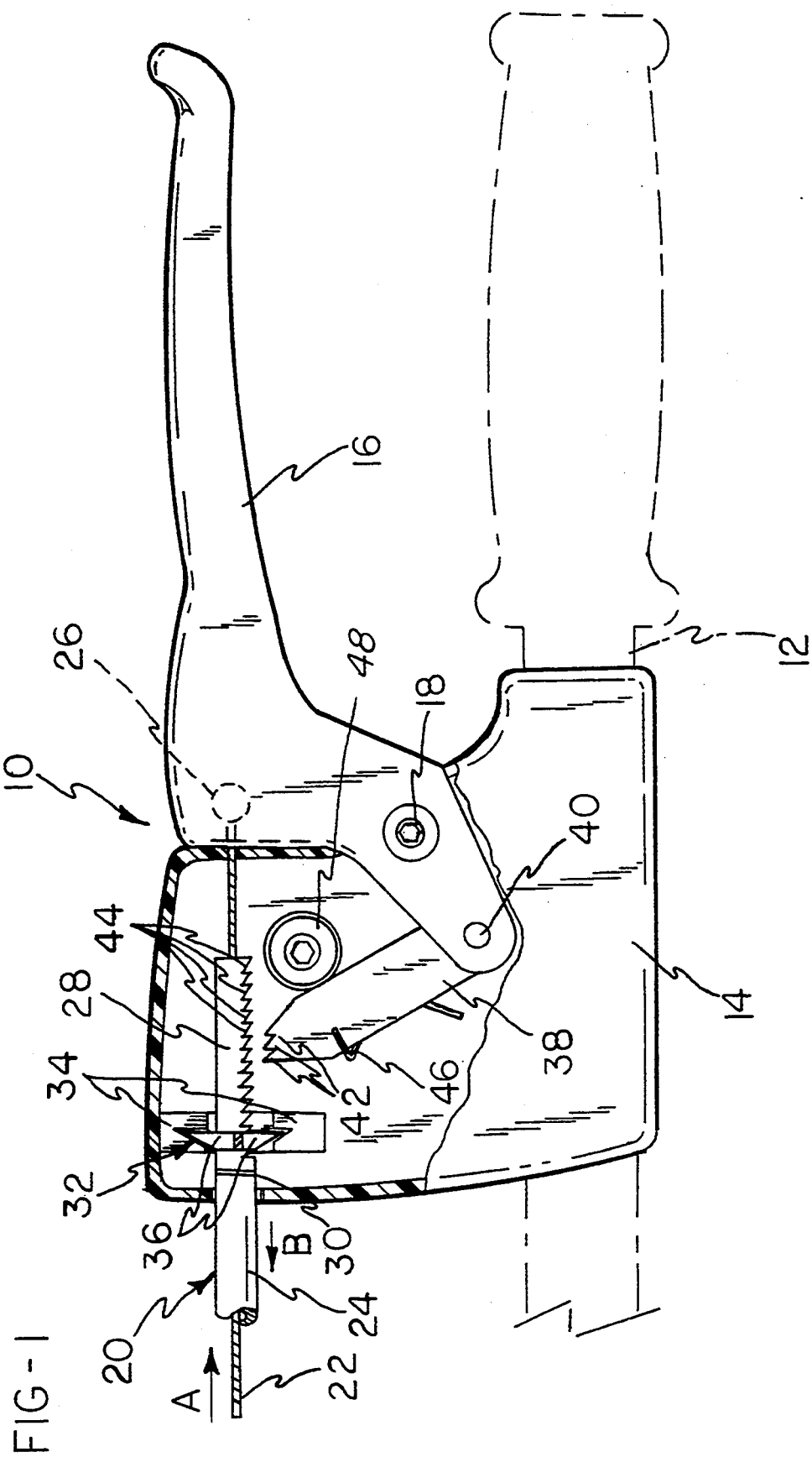
FIG. 1 is a side elevational view illustrating the operative components of the self-adjusting actuation mechanism of the present invention.
Figure 2:
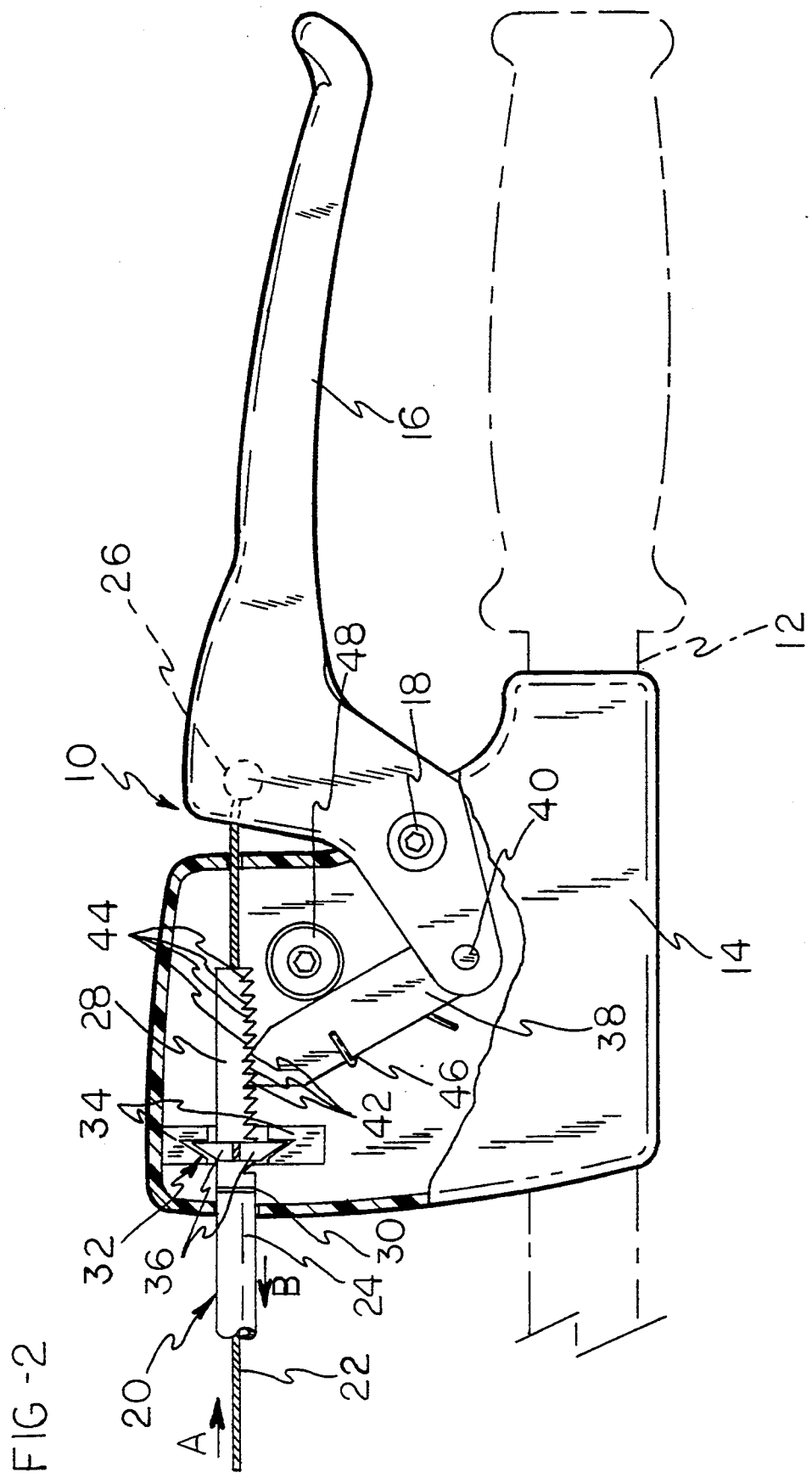
FIG. 2 is a view similar to FIG. 1 wherein the lever has been pivoted to move the pawl into engagement with the abutment member.
Figure 3:
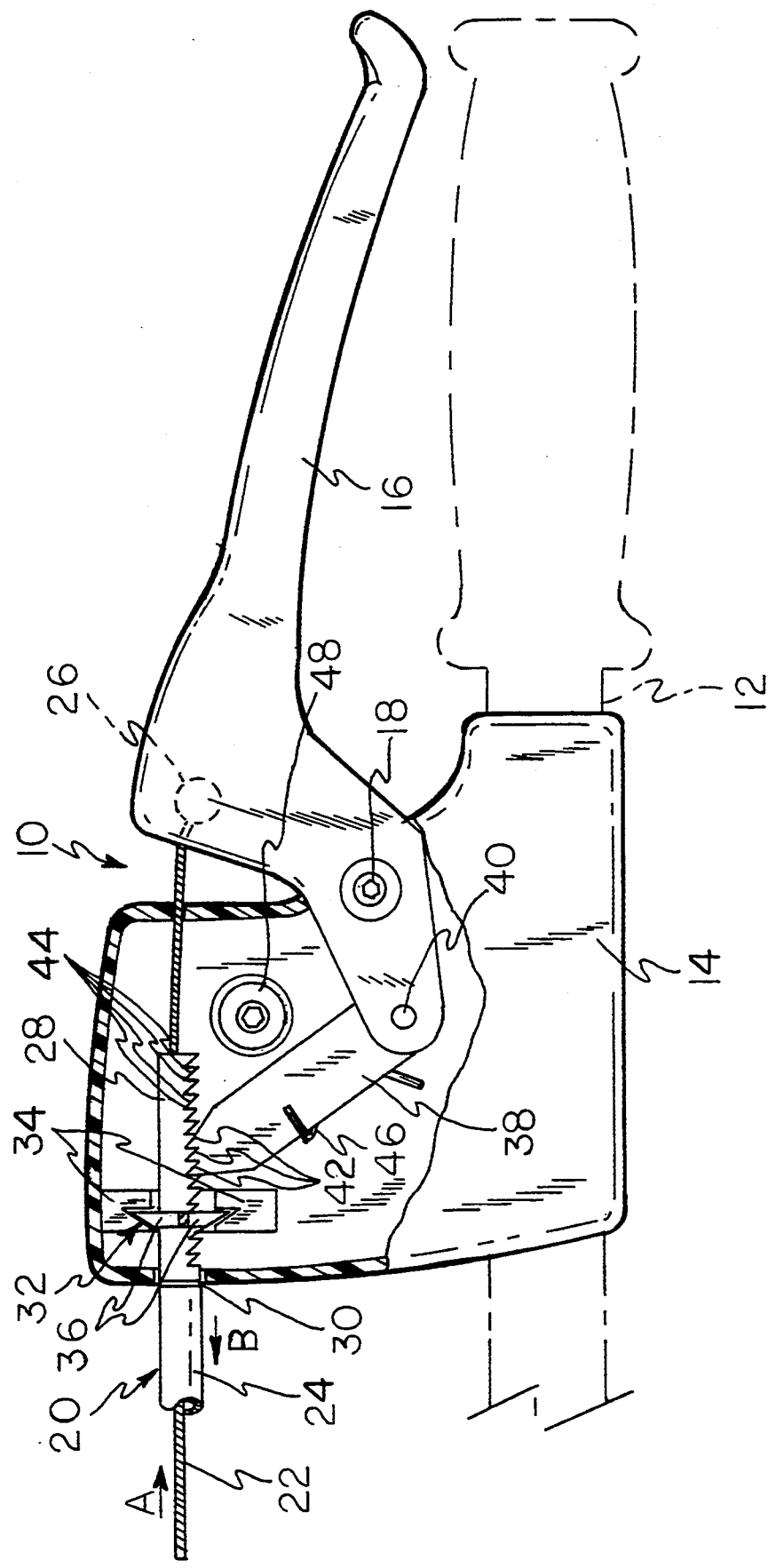
FIG. 3 is a view similar to FIG. 1 wherein the pawl member has actuated the abutment member to adjust the actuation mechanism.

Referring to FIGS. 1–3, the self-adjusting actuation mechanism 10 of the present invention is shown mounted to a bicycle handlebar 12 depicted in phantom lines, and the actuation mechanism 10 is preferably used in a cable actuated system such as a bicycle caliper brake system.

The actuation system includes a housing 14, partially cut away to show the elements of the invention, and a lever 16 attached to the housing 14 at a pivot point 18 whereby the lever 16 is mounted for pivotal movement relative to the housing 14.

A cable assembly 20 extends from an actuated member, such as a brake caliper, to the housing 14 and includes a cable 22 and a sheath 24 surrounding the cable 22. The cable 22 includes a slug 26 on the end thereof seated in the lever 16 in a conventional manner. As the lever is pivoted from a rest position, as shown in FIG. 1, to an actuated position, as depicted in FIGS. 2 and 3, the cable 22 is caused to slide through the sheath 24 in a first direction A whereby an actuated mechanism (not shown) at the opposing end of the cable assembly 20 is operated. A tubular abutment member 28 surrounds the cable 22 and is supported within the housing 14 in engagement with an end 30 of the sheath 24.

A push nut 32 is mounted within the housing 14 and is held in stationary relationship thereto by slot members 34. The push nut 32 includes resiliently flexible fingers 36 which permit movement of the abutment member 28 in a second direction B opposite to direction A away from the lever 16 and out of the housing 14, and the push nut 32 prevents movement of the abutment member 28 in the direction A.

An elongated pawl member 38 is pivotally mounted to the lever 16 at a pivot point 40. The pawl member includes a plurality of prongs 42 at an engagement end thereof engaging a plurality of teeth 44 defining a toothed surface on the abutment member 28. Thus, the teeth 44 and pawl member 38 cooperate with each other to define transfer means for moving the abutment member 28 in direction B relative to the housing 14 during actuation of the lever 16.

A spring 46 is provided mounted to the housing 14 for biasing the pawl member 38 upwardly toward the abutment member 28. In addition, a pawl stop 48 is located on the housing 14 for engaging and limiting movement of the pawl member 38 toward the toothed surface defined by the teeth 44. As is illustrated in FIG. 1, the stop 48 guides the pawl member 38 into spaced relation relative to the teeth 44 during movement of the lever 16 to the rest position depicted in FIG. 1.

It should be noted that although the spring 46 for biasing the pawl member 38 upwardly is illustrated as a spring wire member, other springs such as coil or leaf springs may also be used.

Referring to FIG. 2, as the lever 16 is actuated, the pawl member 38 is caused to move upwardly toward the abutment member 28. When the mechanism 10 is properly adjusted, the actuated mechanism, such as a brake caliper, will be fully operated just as, or slightly before, the prongs 42 come into contact with the teeth 44 of the abutment member 28 such that no movement of the abutment member 28 occurs.

FIG. 3 illustrates the operation of the actuation mechanism 10 wherein the prongs 42 of the pawl member 38 have engaged the teeth 44 of the abutment member 28, as shown in FIG. 2, and the pawl member 38 has moved the abutment member 28 in the direction B to cause the effective length of the sheath 24 to be increased. The push nut 32 prevents the abutment member 28 from moving back into the housing in the direction A once the pawl member 38 has moved the abutment member 28 to a new adjustment position.

It should be noted that the actuation mechanism 10 of the present invention is preferably constructed such that a portion of the housing covering the components shown in FIGS. 1-3 may be removed from the housing 14 to expose the operable components whereby the push nut 32 and abutment member 28 may be removed and restored to an original adjustment position, such as that shown in FIG. 1, when the adjustment potential for the actuation mechanism 10 is used up. Further, when the actuation mechanism 10 is restored to its original adjustment position, the attachment point between the cable 22 and the brake caliper, or other actuated mechanism, must also be adjusted in order to compensate for the difference in the effective sheath length which had previously been accommodated by the abutment member 28.

From the above description, it should be apparent that the present invention provides an actuation mechanism wherein the range of movement of a cable relative to a sheath is adjusted in response to movement of a lever beyond a predetermined limit position, as illustrated by FIG. 2, as the lever is pivoted from a rest position to an actuated position. In addition, it should be apparent that the present invention provides such a mechanism without requiring the conscious effort of an operator to obtain the necessary adjustment.

Further, it should be noted that other mechanisms, equivalent to the disclosed pawl member, may be used to move the abutment member. For example, a small toothed pinion or section of a pinion could also be incorporated into the present actuation mechanism to effect movement of the abutment member in accordance with the present invention.

While the form of apparatus herein described constitutes a preferred embodiment of the invention, it should be understood that the invention is not limited to this precise form of apparatus, and that changes may be made therein without departing from the scope of the invention which is defined in the appended claims.

What is claimed is:

1. A self adjusting actuation mechanism comprising:
   a housing,
   a lever operatively attached to said housing,
   a cable assembly including a sheath and a cable slidably positioned within said sheath,
   a connection between said cable and said lever wherein movement of said lever relative to said housing causes movement of said cable in a first direction relative to said sheath,
   adjustment means mounted for movement to adjust the range of movement of said cable relative to said sheath in response to movement of said lever beyond a predetermined limit, said adjustment means including an abutment member located on said housing adjacent to an end of said sheath for moving said sheath relative to said housing and transfer means attached to said lever for moving said abutment member in a second direction, opposite to said first direction, away from said lever in response to movement of said lever pulling said cable in said first direction, and
   wherein said transfer means is longitudinally movable in said second direction to cause said abutment member to slide through said housing in said second direction.

2. The mechanism as in claim 1 wherein said transfer means comprises a toothed surface on said abutment member and a pawl member connected to said lever for engagement with said toothed surface during said movement of said lever.

3. The mechanism as in claim 1 including a push nut mounted to said housing and slidably engaging said abutment member during movement of said abutment member in said second direction and preventing said abutment member from moving in said first direction.

4. The mechanism as in claim 1 including a pivot point between said lever and said housing such that said lever is mounted for pivotal movement to pull said cable through said sheath.

5. The mechanism as in claim 4 wherein said abutment member surrounding said cable and engaging an end of said sheath and a pawl member connected to said lever such that movement of said lever pulling said cable in said first direction toward said housing causes said pawl member to push said abutment member toward said sheath.

6. A self adjusting actuation mechanism comprising:
   a housing,
   a lever attached to said housing at a pivot point,
   a cable assembly including a sheath and a cable slidably positioned within said sheath,
   a connection between said cable and said lever wherein actuation of said lever causes said cable to move in a first direction, an abutment member supported by said housing in engagement with an end of said sheath, a pawl member pivotally mounted to said lever, said pawl member including an engagement end for engaging said abutment member, and wherein said engagement end of said pawl member and said abutment member move together relative to said housing in a second direction, opposite to said first direction, in response to actuation of said lever.

7. The mechanism as in claim 6 including a spring for biasing said engagement end of said pawl member toward said abutment member.

8. The mechanism as in claim 7 including a stop located on said housing for limiting movement of said engagement end of said pawl member toward said abutment member.

9. The mechanism as in claim 8 wherein movement of said lever to a rest position causes said engagement end of said pawl member to move to a position in spaced relation to said abutment member.

10. The mechanism as in claim 6 wherein said abutment member includes a toothed surface and said engagement end of said pawl member includes at least one prong for engaging with said toothed surface to push said abutment member relative to said housing.

11. The mechanism as in claim 6 including a push nut mounted to said housing, said push nut slidably engaging and permitting said abutment member to move in said second direction and preventing said abutment member from moving in said first direction.

12. A self adjusting actuation mechanism for use in a cable actuated system, said mechanism comprising:

a housing, a lever attached to said housing at a pivot point, said lever being pivotally movable between a rest position and an actuated position, a cable assembly including a sheath and a cable slidably positioned within said sheath, a connection between said cable and said lever wherein movement of said lever to said actuated position causes said cable to move in a first direction, a tubular abutment member surrounding said cable and supported by said housing in engagement with an end of said sheath, said abutment member including a toothed surface, a push nut positioned on said housing and surrounding said abutment member, said push nut permitting movement of said abutment member in a second direction, opposite to said first direction, and preventing movement of said abutment member in said first direction, an elongated pawl member pivotally mounted to said lever, said pawl member including an engagement end having at least one prong for engaging said toothed surface whereby said abutment member is moved in said second direction during movement of said lever to said actuated position, a spring for biasing said engagement end of said pawl member in a direction toward said toothed surface, a stop located on said housing for engaging and limiting movement of said pawl member toward said toothed surface said stop guiding said pawl member into spaced relation to said toothed surface during movement of said lever to said rest position, and wherein the range of movement of said cable relative to said sheath is adjusted in response to movement of said lever beyond a predetermined limit as said lever is pivoted from said rest position to said actuated position.

* * * * *